US012619067B2

(12) United States Patent (10) Patent No.: US 12,619,067 B2
Ogawa (45) Date of Patent: May 5, 2026

(54) DISPLAY DEVICE

(71) Applicant: SONY GROUP CORPORATION, Tokyo (JP)

(72) Inventor: Yusuke Ogawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 266 days.

(21) Appl. No.: 18/260,705

(22) PCT Filed: Dec. 27, 2021

(86) PCT No.: PCT/JP2021/048554

§ 371 (c)(1),
(2) Date: Jul. 7, 2023

(87) PCT Pub. No.: WO2022/163282

PCT Pub. Date: Aug. 4, 2022

(65) Prior Publication Data

US 2024/0061237 A1 Feb. 22, 2024

(30) Foreign Application Priority Data

Jan. 29, 2021 (JP) ................................. 2021-013186

(51) Int. Cl.
*G02B 26/10* (2006.01)
*G02B 27/01* (2006.01)

(52) U.S. Cl.
CPC ......... *G02B 26/10* (2013.01); *G02B 27/0172* (2013.01); *G02B 2027/0174* (2013.01); *G02B 2027/0178* (2013.01)

(58) Field of Classification Search
CPC ............... G02B 26/10; G02B 27/0172; G02B 2027/0174; G02B 2027/0178; G02B 26/101; G02B 2027/0147

(Continued)

(56) References Cited

U.S. PATENT DOCUMENTS

2011/0122101 A1 5/2011 Kurozuka
2013/0201459 A1 8/2013 Seo et al.
(Continued)

FOREIGN PATENT DOCUMENTS

JP 2011215398 A * 10/2011
JP 2013-130832 7/2013
(Continued)

OTHER PUBLICATIONS

Takayama et al. JP 2011215398 A, Image Display Apparatus; Examiner provided machine translation; (Year: 2011).*
(Continued)

*Primary Examiner* — Bumsuk Won
*Assistant Examiner* — Rahman Abdur
(74) *Attorney, Agent, or Firm* — SHERIDAN ROSS P.C.

(57) ABSTRACT

The present disclosure provides a technology for dealing with coarseness and minuteness of an interval of scanning lines that occur in a case where the Foveated rendering technology is applied. The present disclosure provides a display device including: a laser light source unit that emits laser light used for video formation by scanning; and a laser light source drive unit, in which the laser light source unit can emit two or more pieces of laser light having different beam sizes, or can emit two or more pieces of laser light and can switch the number of pieces of emitted laser light, and the laser light source drive unit changes the laser light emitted from the laser light source unit according to an interval of scanning lines where two or more non-resonant axial direction scanning speeds are used in a drawing region of one frame of a video.

14 Claims, 7 Drawing Sheets

(58) Field of Classification Search
USPC ...................................................... 359/201.1
See application file for complete search history.

(56) References Cited

U.S. PATENT DOCUMENTS

| | | |
|---|---|---|
| 2018/0295331 A1 | 10/2018 | Tardif et al. |
| 2020/0073115 A1 | 3/2020 | Smits |
| 2020/0090569 A1 | 3/2020 | Hajati |
| 2020/0152105 A1 | 5/2020 | Ishii |
| 2020/0366875 A1 | 11/2020 | Pilard et al. |
| 2022/0011660 A1 | 1/2022 | Ogawa |

FOREIGN PATENT DOCUMENTS

| | | |
|---|---|---|
| JP | 2013-161016 | 8/2013 |
| JP | 2020-510870 | 4/2020 |
| WO | WO 2010/044205 | 4/2010 |
| WO | WO 2018/122902 | 7/2018 |
| WO | WO-2018175265 A1 | 9/2018 |
| WO | WO 2020/110757 | 6/2020 |

OTHER PUBLICATIONS

International Search Report and Written Opinion prepared by the Japan Patent Office on Feb. 15, 2022, for International Application No. PCT/JP2021/048554, 3 pgs.

* cited by examiner

DISPLAY DEVICE

CROSS REFERENCE TO RELATED APPLICATIONS

This application is a national stage application under 35 U.S.C. 371 and claims the benefit of PCT Application No. PCT/JP2021/048554, having an international filing date of 27 Dec. 2021, which designated the United States, which PCT application claimed the benefit of Japanese Patent Application No. 2021-013186, filed 29 Jan. 2021, the entire disclosures of each of which are incorporated herein by reference.

TECHNICAL FIELD

The present disclosure relates to a display device. More specifically, the present disclosure relates to a display device that presents a video by laser light scanning.

BACKGROUND ART

In recent years, attention has been focused on technology of superimposing an image on a scene of an outside world. The technology is also called augmented reality (AR) technology, and AR glasses can be cited as a product using the technology. Examples of AR glasses include devices using displays and devices using laser beam scan (also referred to as LBS).

For AR glasses using the LBS, a Foveated rendering technology may be used. This technology slows down the scanning speed of the MEMS only in a portion that a user is gazing at (in particular, only in a fovea part), which relaxes the required MEMS specification. Regarding a device using this technology, for example, Patent Document 1 below discloses "A scanning display system including: a laser light source including two or more offset lasers; a scanning mirror system configured to scan light from the laser light source in a first direction at a higher frequency, and in a second direction at a lower frequency to form an image; and a controller configured to control the scanning mirror system to scan the laser light in an interlaced pattern to form the image, and to adjust one or more of a scanning speed in the second direction and a phase offset between a first frame and a second frame of the interlaced image." (Claim 1).

CITATION LIST

Patent Document

Patent Document 1: Japanese Translation of PCT Application No. 2020-510870

SUMMARY OF THE INVENTION

Problems to be Solved by the Invention

In the field related to AR glasses, it is required to achieve both wide angle of view and high resolution. The AR glasses using the display described above can achieve a wide angle of view but have a low resolution (PPD). On the other hand, since the AR glasses using the LBS are of the Scan method, the number of scanning lines in one frame increases when the angle of view is widened. In order to cope with an increase in the number of scanning lines, a scanning mirror having higher performance, in particular, a scanning mirror having a higher resonance frequency of scanning is required.

Furthermore, when the number of scanning lines increases, the amount of video data to be transferred increases accordingly, and thus there are disadvantages such as an increase in power consumption and delay.

The Foveated rendering technology may be utilized to mitigate the performance of the scanning mirrors required. In this technology, for example, the number of scanning lines is increased and high resolution is maintained by slowing the speed of the scanning mirror only at a portion (particularly, a region including the fovea) at which the AR eyewear wearer is gazing, and the number of scanning lines is decreased and low resolution is achieved by increasing the speed of the scanning mirror at other portions. Therefore, in a case where this technology is applied, a rapid change in the scanning speed occurs in one frame. Furthermore, in this technology, a region where the scanning lines drawn by the scanning mirror are coarse and a region where the scanning lines drawn by the scanning mirror are minute are generated in one frame.

In a case where the Foveated rendering technology is applied, as described above, coarseness and minuteness occurs in the scanning lines. The coarseness and minuteness of the scanning lines may cause image quality degradation of the video. Therefore, it is required to adjust the beam to be scanned to an optimum size according to the scanning speed of the scanning mirror.

Furthermore, in a case where the Foveated rendering technology is applied, the scanning speed of the scanning mirror, particularly, the scanning speed in the non-resonant axial direction rapidly changes. When the scanning speed changes, the operation of the scanning mirror may become unstable, and for example, vibration unnecessary for the scanning mirror may occur. The unnecessary vibration causes deterioration in image quality, and may cause distortion in a video, for example.

Furthermore, in a case where the Foveated rendering technology is applied, it is conceivable to switch the beam size of the laser light. However, it is difficult to seamlessly switch the beam size.

A main object of the present disclosure is to provide a technology for dealing with coarseness and minuteness of scanning lines that occur in a case where the Foveated rendering technology is applied.

Solutions to Problems

The present disclosure provides a display device including:

a laser light source unit that emits laser light used for video formation by scanning; and a laser light source drive unit that drives the laser light source unit, in which the laser light source unit is configured to be able to emit two or more pieces of laser light having different beam sizes, or configured to be able to emit two or more pieces of laser light and to be able to switch the number of pieces of laser light to be emitted, and the laser light source drive unit changes the laser light emitted from the laser light source unit according to an interval of scanning lines in a case where two or more non-resonant axial direction scanning speeds different from each other are used in a drawing region of one frame of a video.

The laser light source unit may include an optical waveguide element, and the two or more pieces of laser light may be emitted from the optical waveguide element.

The optical waveguide element may have two or more emission points having different sizes, and the two or more pieces of laser light may be emitted from each of the two or more emission points.

In a case where two or more different non-resonant axial direction scanning speeds are used in a drawing region of one frame of a video, the laser light source drive unit may change the beam size of the laser light emitted from the laser light source unit according to the interval of the scanning lines.

The two or more emission points may be provided in the optical waveguide element so as to be aligned in the same direction as the non-resonant axial direction in the scanning.

The two or more emission points may be provided in the optical waveguide element so as to be aligned in the same direction as the resonant axial direction in the scanning.

The laser light source unit may include two or more laser light sources, and the laser light source drive unit may change the beam size of the laser light emitted from the laser light source unit by controlling driving of the two or more laser light sources.

The optical waveguide element includes two or more emission points of the same size, and in a case where two or more different non-resonant axial direction scanning speeds are used in a drawing region of one frame of a video, the laser light source drive unit may change the number of pieces of the laser light emitted from the laser light source unit according to the interval of the scanning lines.

The laser light source unit may be configured to be able to emit two or more pieces of laser light having different beam sizes, and the laser light source drive unit may control the laser light source unit to emit laser light having a smaller beam size at an emission point in a case of drawing a region where a slower non-resonant axial direction scanning speed is used.

The laser light source unit may be configured to be able to emit two or more pieces of laser light and to be able to switch the number of pieces of laser light to be emitted, and the laser light source drive unit may control the laser light source unit to emit a smaller number of pieces of laser light in a case of drawing a region where a slower non-resonant axial direction scanning speed is used.

The laser light source drive unit may stop the emission of the laser light by the laser light source unit while the non-resonant axial direction scanning speed changes in the drawing region of one frame.

The laser light source unit may include an optical waveguide element having two or more emission points having different sizes, and the two or more emission points of the optical waveguide element may be spaced apart such that an angle of view of the laser light in the non-resonant axial direction immediately before a stop period of emission of the laser light matches an angle of view of the laser light in the non-resonant axial direction immediately after the stop period of emission of the laser light.

The display device may be configured to condense the laser light scanned by the scanning mirror near the pupil to reach the retina.

The display device may be configured to cause the laser light scanned by the scanning mirror to reach the projection surface without through a projection optical system or through the projection optical system.

MODE FOR CARRYING OUT THE INVENTION

Figure 1A:
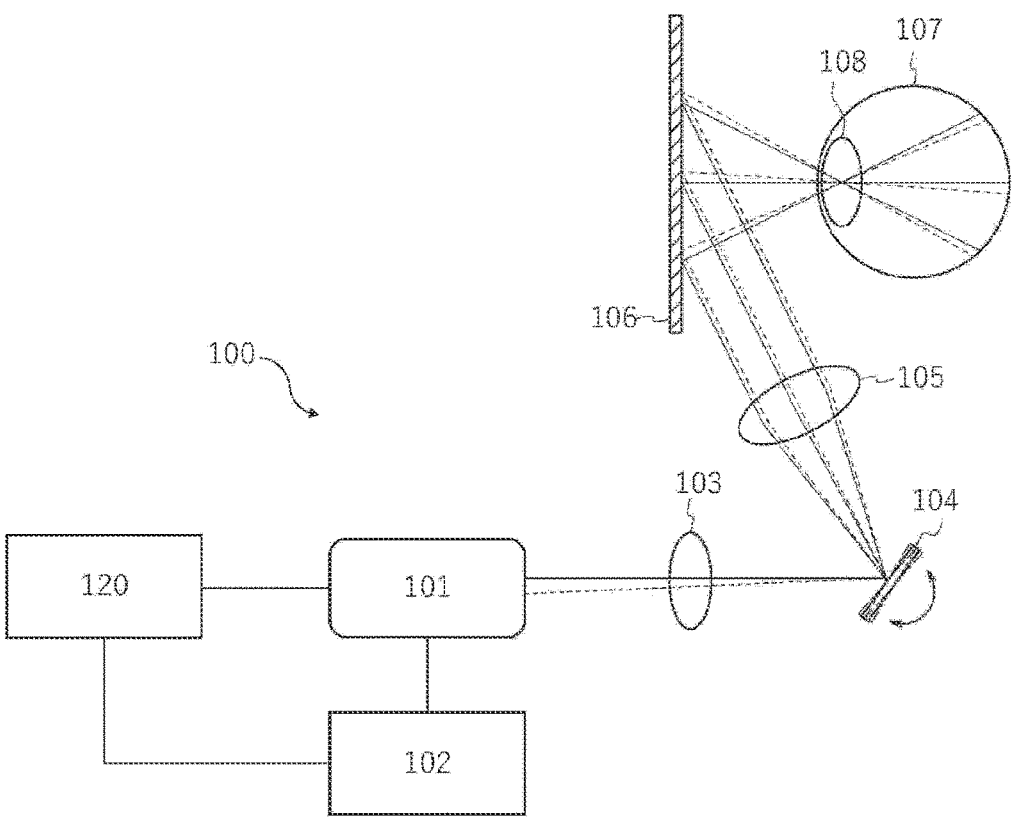
FIG. 1A is a diagram illustrating a configuration example of a display device according to the present disclosure.

Hereinafter, preferred embodiments for carrying out the present disclosure will be described. Note that the embodiments described below are typical embodiments of the present disclosure, and the scope of the present disclosure should not be limited to these embodiments. Note that the present disclosure will be described in the following order.

1. Basic concept of present disclosure
2. First embodiment of present disclosure (retina direct drawing type display device)
   (1) Laser light source unit including optical waveguide and laser light source drive unit
   (2) Laser light source unit including collimator lens
   (3) Switching of number of pieces of emitted laser light
   (4) Scanning mirror and scanning mirror drive unit
   (5) Optical waveguide element including switching unit
   (6) Multiplexing pieces of laser light of plurality of colors (7) Line-of-sight detection unit (8) Other components 3. Second embodiment of present disclosure (projector)

1. Basic Concept of Present Disclosure

In a case where the Foveated rendering technology is applied, as described above, it is required to deal with coarseness and minuteness of the scanning lines. Furthermore, in a case where this technology is applied, a problem of image quality degradation due to unnecessary vibration of a scanning mirror may also occur.

A display device according to the present disclosure includes a laser light source unit that emits laser light used for video formation by scanning, and a laser light source drive unit that drives the laser light source unit. The laser light source unit may be configured to be able to emit two or more pieces of laser light having different beam sizes, or may be configured to be able to emit two or more pieces of laser light and switch the number of pieces of laser light to be emitted. Moreover, the laser light source drive unit may be configured to change the laser light emitted from the laser light source unit according to the interval of the scanning lines in a case where two or more different non-resonant axial direction scanning speeds are used in a drawing region of one frame of a video.

The display device according to the present disclosure includes the laser light source unit and the laser light source drive unit configured as described above, so that the display device can appropriately deal with the coarseness and minuteness of the scanning lines generated in a case where the Foveated rendering technology is applied. For example, the display device according to the present disclosure can change the beam size according to coarseness and minuteness of the scanning lines, thereby preventing image quality degradation that may occur due to coarseness and minuteness of the scanning lines.

Patent Document 1 described above does not disclose image quality degradation due to unnecessary vibration of the scanning mirror as described above and image quality degradation due to a change in a scanning line interval. Moreover, a technology of addressing these problems is not disclosed. The present disclosure can solve these problems of image quality degradation.

In an embodiment of the present disclosure, the laser light source unit may include an optical waveguide element, and the two or more pieces of laser light may be emitted from the optical waveguide element. The optical waveguide element can appropriately switch the laser light required in a case where the Foveated rendering technology is applied.

By using the optical waveguide element, for example, emitted laser light can be switched from laser light having a certain beam size to laser light having another beam size. As a result, it is possible to deal with coarseness and minuteness of the scanning lines.

Furthermore, the number of pieces of laser light to be emitted can be changed by using the optical waveguide element. For example, the number of pieces of laser light used to draw one scanning line can be reduced or increased, and thereby it is possible to deal with the coarseness and minuteness of the scanning lines.

In the optical waveguide element, the position of the emission point and the arrangement of the emission light can be adjusted with high accuracy. Moreover, the optical waveguide element is excellent in environmental resistance, and these positions and arrangements are not easily affected by the environment. Furthermore, since the two or more emission points can be integrated into one optical waveguide element, the display device can be downsized.

For example, the optical waveguide element may have two or more emission points having different sizes, and may be configured to emit the two or more pieces of laser light from each of the two or more emission points. The optical waveguide element can switch the emission port at a high speed required in the Foveated rendering technology. As a result, it is possible to appropriately deal with coarseness and minuteness of the scanning lines.

In an embodiment of the present disclosure, in a case where two or more different non-resonant axial direction scanning speeds are used in a drawing region of one frame of a video, the laser light source drive unit may change the beam size of the laser light emitted from the laser light source unit according to the interval of the scanning lines.

For example, the laser light source drive unit may change the beam size such that laser light having a larger beam size reaches a region having a larger scanning line interval in the drawing region. Furthermore, the laser light source drive unit may change the beam size such that laser light having a smaller beam size reaches a region having a smaller scanning line interval in the drawing region.

In order to change the beam size, for example, the laser light source drive unit may drive the laser light source unit such that the laser light is emitted from any one of two or more emission points having different sizes according to the scanning line interval.

The two or more emission points may be provided in the optical waveguide element so as to be aligned in the same direction as the non-resonant axial direction in the scanning. This makes it easier to cope with the change in the scanning line interval.

The two or more emission points may be provided in the optical waveguide element so as to be aligned in the same direction as the resonant axial direction in the scanning. As a result, the number of buffers for the video data may be reduced.

The display device according to the present disclosure may further include a scanning mirror that performs laser light scanning for forming the video. For example, the scanning mirror may be a micro electro mechanical systems (MEMS) mirror. As the MEMS mirror, a commercially available MEMS mirror may be used, or a MEMS mirror manufactured by a method known in the art may be used. MEMS mirrors are typically fabricated by microfabrication technologies of semiconductor processes. The MEMS mirror scans light by resonance of a minute mirror of about Φ1 mm.

In one embodiment of the present disclosure, the scanning mirror drive unit drives the scanning mirror such that the scanning speed of the laser light reaching the region including the fovea is slower than the scanning speed of the laser light reaching the region not including the fovea. In a case where the Foveated rendering technology is applied, with respect to the scanning speed of the laser light for scanning the drawing region of one frame in the non-resonant axial direction, the scanning speed when drawing the region including the fovea is slower than the scanning speed when drawing the other region. As a result, it is possible to selectively improve the image quality of the region of the display device that the user is gazing at.

The display device of the present disclosure may further include a line-of-sight detection unit. The line-of-sight detection unit may be configured to detect a line-of-sight of the user wearing the display device, and a device configuration thereof may be appropriately selected by a person skilled in the art. For example, the line-of-sight detection unit may be configured to detect a line-of-sight on the basis of corneal reflection, or may be configured to detect a line-of-sight on the basis of a three-dimensional eyeball model. In the former case, the line-of-sight detection unit may include, for example, a light source (for example, an LED) configured to emit infrared light (particularly, near-infrared light) toward the eyeball, and an imaging element that acquires an image by the irradiation. In the latter case, the line-of-sight detection unit includes an imaging element configured to acquire a face image of a user of the display device. The line-of-sight is detected on the basis of the information regarding the eyeball obtained by analyzing the face image.

Preferably, the line-of-sight detection unit may be configured to specify a region including the fovea on the basis of the detected line-of-sight. For example, the line-of-sight detection unit may specify the position of the fovea, and then specify the region including the fovea on the basis of the specified position of the fovea. The scanning mirror drive unit may drive the scanning mirror on the basis of the region including the fovea specified by the line-of-sight detection unit. The region including the fovea may be a region including the fovea and covering an angle of view of 4° or more in the non-resonant axial direction. For example, the region including the fovea may be, for example, a region covering an angle of view of 4° or more and 45° or less, particularly 5° or more and 30° or less in the non-resonant axial direction. The region including the fovea may be flexibly changed in the drawing region on the basis of, for example, the detected line-of-sight or the position of the fovea.

The display device of the present disclosure may drive the scanning mirror such that the scanning lines in the non-resonant axial direction are minute (that is, the scanning line interval becomes narrower) in a case where the region including the specified fovea is drawn as compared with a case where other regions are drawn.

The projection target that the laser light scanned by the scanning mirror reaches may be, for example, a retina of an animal (particularly, a human) or an arbitrary projection surface other than the retina. In a case where the projection target is a retina, for example, a hologram element may be used for projection onto the retina. In a case where the projection target is any projection surface, the projection surface includes, but is not limited to, a wall, a desk, a screen, and the like, for example. In this case, the display device is used in a mode in which the user recognizes the video displayed on the projection surface.

According to an embodiment of the present disclosure, the display device may further include a hologram element that converges the laser light scanned by the scanning mirror near the pupil and reaches the retina. That is, the display device according to the present disclosure may be configured to condense the laser light scanned by the scanning mirror near the pupil to reach the retina. By condensing the laser light near the pupil, it is possible to present a video in a so-called Maxwellian view.

In the present disclosure, for example, the scanned laser light may be collected on the pupil or may be shifted from the pupil by several mm to a dozen mm (for example, 1 mm to 20 mm, particularly 2 mm to 15 mm) in an optical axial direction. As in the latter case, Maxwellian view can be realized even if the focal point is not on the pupil. Shifting the focal point in the optical axial direction can make it difficult for the user to lose a video image even if the video image is shifted. More specifically, the diffracted light may be focused on the pupil, in the crystalline lens, or between a corneal surface and the pupil.

According to another embodiment of the present disclosure, the display device may cause the laser light scanned by the scanning mirror to reach the projection surface without through the projection optical system or through the projection optical system. That is, the display device may be configured as a projector that projects a video onto any projection surface. The projector may be configured as, for example, a small projector (also referred to as a pico projector).

2. First Embodiment of Present Disclosure (Retina Direct Drawing Type Display Device)

According to an embodiment of the present disclosure, the display device may further include a hologram element that converges the laser light scanned by the scanning mirror near the pupil and reaches the retina. The hologram element enables projection of a video image of a retina direct drawing type. The retina direct drawing type video projection is also referred to as video projection in a Maxwellian view.

Hereinafter, an example of the display device according to this embodiment will be described with reference to FIGS. 1A and 1B.

FIG. 1A illustrates a configuration example of a display device 100 according to the present disclosure. The display device 100 includes a drawing system 101, a line-of-sight detection unit 102, a collimator lens 103, a scanning mirror 104, a relay lens 105, and a hologram element 106.

The display device 100 is configured to receive video data from an information processing device (for example, a computer, a cloud, or the like) 120 and present a video in a Maxwellian view to the user on the basis of the video data. More specifically, for the video presentation, the laser light emitted from the drawing system 101 is reflected by the scanning mirror 104, diffracted by the hologram element 106, and then condensed in the vicinity of a pupil 108 in an eyeball 107 to be applied to the retina.

The drawing system 101 may be configured to emit laser light for presenting a video toward the scanning mirror 104 on the basis of the received video signal.

Figure 1B:
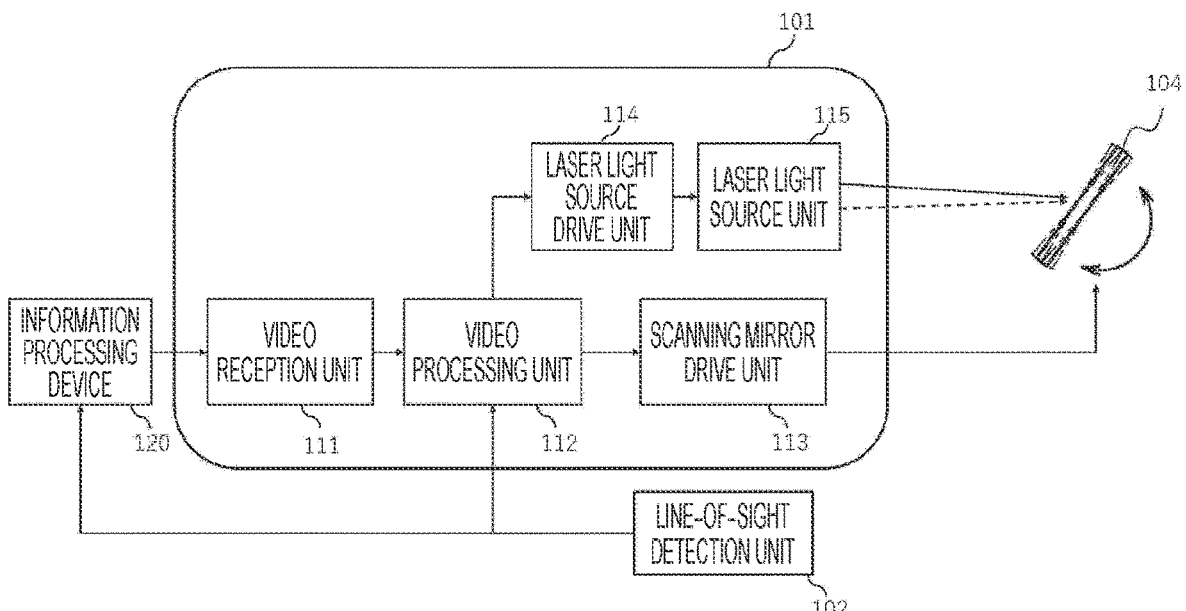
FIG. 1B is an example of a block diagram of components included in a drawing system.

FIG. 1B is an example of a block diagram of components included in the drawing system 101. The drawing system 101 includes a video reception unit 111, a video processing unit 112, a scanning mirror drive unit 113, a laser light source drive unit 114, and a laser light source unit 115. These components will be described below.

The video reception unit 111 receives the video signal transmitted from the information processing device 120, and then transmits the video signal to the video processing unit 112. The video reception unit 111 may be a video receiver, and more specifically, may be a digital video receiver or an analog video receiver. The digital video receiver may be, for example, a digital video receiver conforming to a standard such as DVI, HDMI (registered trademark), or DisplayPort. The analog video receiver may be, for example, an analog RGB receiver.

The video processing unit 112 receives the video signal transmitted from the video reception unit 111, and controls the display device 100 on the basis of the video signal. For example, the video processing unit 112 controls the scanning mirror drive unit 113 and the laser light source drive unit 114 on the basis of the video signal. As a result, video presentation with the laser light is performed. Furthermore, in addition to the video signal, the video processing unit 112 may control the video to be presented on the basis of the information regarding the line-of-sight acquired by the lineof-sight detection unit 102. The video processing unit 112 may include, for example, a microprocessor, a system-on-a-chip (SoC), and a field-programmable gate array (FPGA).

Note that the drawing system 101 may include a video accumulation unit (not illustrated). The video accumulation unit writes and/or reads a signal in order to process the video signal output from the video reception unit 111. The video accumulation unit includes, for example, SDRAM, and more specifically may include DDR2SDRAM, DDR3SDRAM, DDR4SDRAM, or the like.

(1) Laser Light Source Unit and Laser Light Source Drive Unit

The laser light source drive unit 114 outputs a drive signal for driving the laser light source unit 115. The laser light source drive unit 114 may include, for example, a D/A converter that converts a digital signal output from video processing unit 112 into an analog signal.

The laser light source unit 115 is driven by the laser light source drive unit 114 to output laser light. The laser light is scanned by the scanning mirror 104, and thereby a video is presented to the user.

A more specific configuration of the laser light source unit 115 will be described with reference to FIG. 2.

Figure 2:
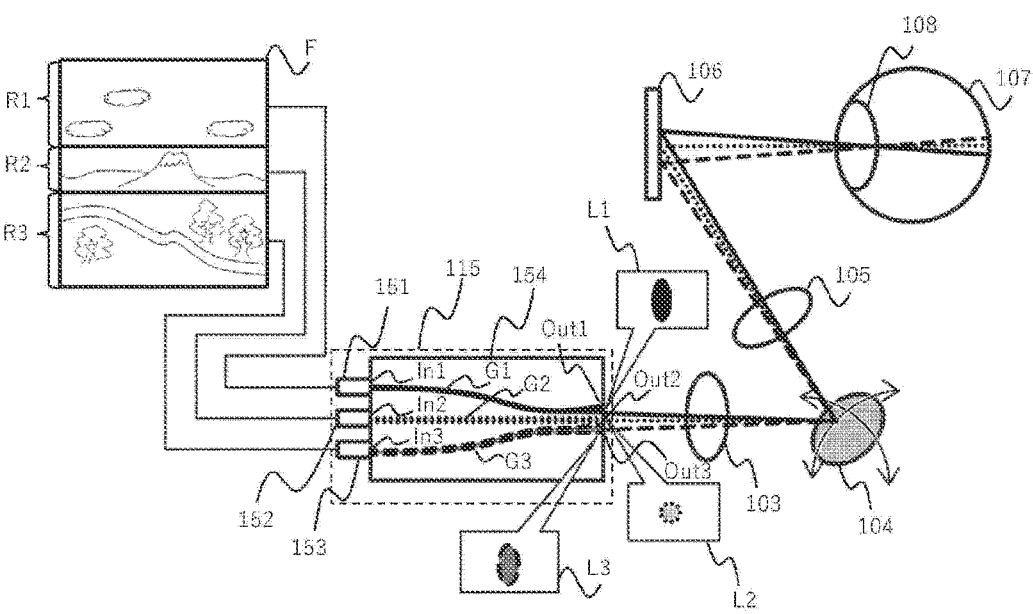
FIG. 2 is a diagram illustrating a specific configuration example of a laser light source unit.

As illustrated in FIG. 2, the laser light source unit 115 includes laser light sources 151, 152, and 153 and an optical waveguide element 154. The optical waveguide element 154 includes three waveguides G1, G2, and G3. The waveguide G1 is configured to guide the laser light incident on an incident port In1 to an emission point Out1. Similarly, a waveguide G2 is also configured to guide the laser light incident on an incident port In2 to an emission point Out2, and a waveguide G3 is also configured to guide the laser light incident on an incident port In3 to an emission point Out3. As illustrated in the drawing, the emission points Out1, Out2, and Out3 may be provided on one emission surface of the optical waveguide element 154.

Note that the configuration of the waveguide in the optical waveguide element 154 is not limited to that illustrated in FIG. 2, and may be appropriately designed by a person skilled in the art according to the number and/or arrangement of the incident ports and/or the emission points.

The laser light source 151 is connected to the optical waveguide element G1 such that laser light emitted from the laser light source is incident on the incident port In1 of the waveguide G1.

The laser light source 152 is connected to the optical waveguide element G2 such that laser light emitted from the laser light source is incident on the incident port In2 of the waveguide G2.

The laser light source 153 is connected to the optical waveguide element G3 such that laser light emitted from the laser light source is incident on the incident port In3 of the waveguide G3.

The sizes of the emission points Out1 and Out3 are larger than the size of the emission point Out2. That is, the beam size of the laser light emitted from the emission points Out1 and Out3 is larger than the beam size of the laser light emitted from the emission point Out2 at the emission point. As described above, the laser light source unit 115 is configured to be able to emit two or more pieces of laser light having different beam sizes.

In the retina direct drawing type display device 100, the magnitude relationship of the beam sizes of these pieces of laser light is the same even when the pieces of laser light reach the retina of the eyeball 107. That is, the beam size of the laser light emitted from the emission points Out1 and Out3 is larger than the beam size of the laser light emitted from the emission point Out2 when the laser light reaches the retina by the optical system of the display device.

Note that the diverging angle of a small beam at the time of emission increases. Therefore, in the retina direct drawing type display device 100, the magnitude relationship between these beam sizes is opposite on the optical path from the collimator lens 103 to the scanning mirror 104, for example. Thereafter, after the light is collected by the holographic optical element 106, particularly when the light reaches the retina of the eyeball 107, the magnitude relationship between the beam sizes is changed again, and becomes the same as the magnitude relationship at the emission point as described above.

By the laser light source unit 115 including the laser light source groups having different beam sizes, it is possible to cope with the coarseness and minuteness of the scanning lines generated in a case where the Foveated rendering is performed. For example, laser light emitted from the emission points Out1 and Out3 is used to draw a region where the scanning lines are coarse (the scanning line interval is large), and laser light emitted from the emission point Out2 is used to draw a region where the scanning lines are minute (the scanning line interval is small). As a result, the image quality can be improved only in the region including the fovea, and the degradation of the image quality due to the coarseness and minuteness of the scanning lines can be prevented.

For example, a case is assumed where that one frame F in the video illustrated in the upper left of FIG. 2 is drawn while Foveated rendering is applied. Moreover, it is assumed that, in the frame F, the region R2 is specified as a region including the fovea and in which high image quality is required, and the regions R1 and R3 are specified as regions in which high image quality is not required. That is, the scanning line interval for drawing the region R2 is smaller than the scanning line interval for drawing the regions R1 and R3.

Laser light is emitted from laser light source 151 to draw the region R1. While the region R1 is drawn, the laser light emission of the laser light sources 152 and 153 may be stopped.

Next, laser light is emitted from laser light source 152 to draw the region R2. While the region R2 is drawn, the laser light emission of the laser light sources 151 and 153 may be stopped.

Lastly, laser light is emitted from laser light source 153 to draw the region R3. While the region R3 is drawn, the laser light emission of the laser light sources 151 and 152 may be stopped.

The laser light source drive unit 114 drives the laser light source unit 115 (in particular, each laser light source included in the laser light source unit 115) so that such laser emission and stop are performed in the drawing region of one frame.

Here, the beam size of the laser light emitted from the laser light source 152 to draw the region R2 is smaller than the beam size of the laser light emitted from the other laser light sources 151 and 153 at the time of reaching the retina as described above. Therefore, it is possible to prevent image quality degradation due to coarseness and minuteness of the scanning lines while improving the image quality only for the region including the fovea.

In order to switch the laser light source that emits laser light, the laser light source drive unit 114 controls the laser light source 151 to 153. The laser light source drive unit 114 may control driving of these laser light sources on the basis of, for example, a video signal transmitted from the video processing unit 112. As described above, in the present disclosure, the laser light source unit includes two or more laser light sources, and the laser light source drive unit may change the beam size of the laser light emitted from the laser light source unit by controlling driving of the two or more laser light sources. The number of laser light sources included in the laser light source unit may be, for example, 2 to 10, and may be particularly 2 to 6, and more particularly 2, 3, 4, or 5.

For example, the laser light source unit is configured to be able to emit two or more pieces of laser light having different beam sizes, and the laser light source drive unit may control the laser light source unit to emit laser light having a smaller beam size at an emission point (or at the time of reaching the retina) in a case of drawing a region where a slower non-resonant axial direction scanning speed is used.

The optical waveguide element 154 may be commercially available, or may be manufactured by a manufacturing method known in the art. The optical waveguide element 154 may be, for example, a quartz flat type optical wave-guide element. Examples of a method of manufacturing the optical waveguide element 154 include a method of forming a quartz-based glass waveguide on a Si or quartz substrate. The optical waveguide element 154 includes, for example, a core layer and a cladding layer surrounding the core layer and including a material having a refractive index lower than that of the core layer. The optical waveguide is formed by forming the cladding layer around the core layer.

The size of the emission point of the optical waveguide can be adjusted to a desired size, for example, by adjusting the width of the optical waveguide. For example, by adjust-ing the width to a desired size over the entire one optical waveguide, the size of the emission point is also adjusted to the desired size.

Alternatively, by providing a tapered structure only in the vicinity of the emission point in the optical waveguide, the size of the emission point can be adjusted to the desired size.

The emission points Out1, Out2, and Out3 of the optical waveguide element 154 may be arranged in the same direction as the non-resonant axial direction of the scanning mirror 104, or may be arranged in the same direction as the resonant axial direction of the scanning mirror 104. The arrangement of these emission points will be described below with reference to FIGS. 10A, 10B and 10C.

Figures 9, 10A, 10B, 10C:
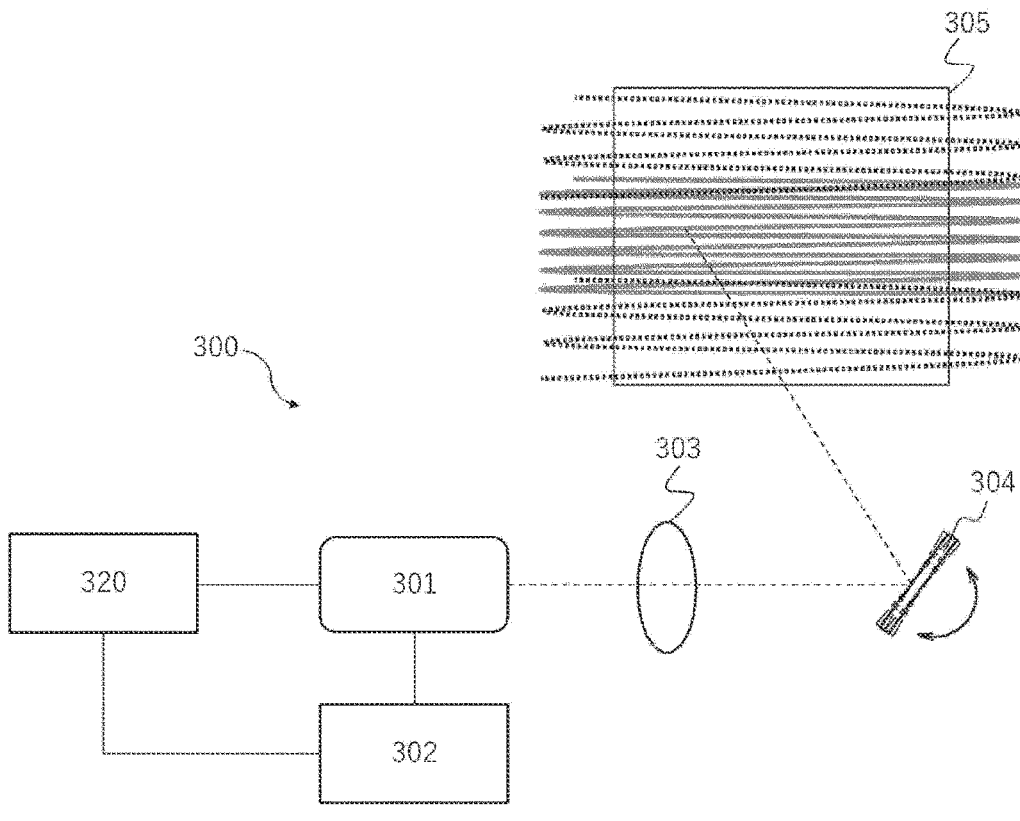
FIG. 9 is a diagram illustrating a display device of the present disclosure configured to display a video on any projection surface.
FIG. 10A is a diagram for explaining the manner of arranging emission points of a plurality of pieces of laser light.
FIG. 10B is a diagram for explaining the manner of arranging emission points of a plurality of pieces of laser light.
FIG. 10C is a diagram for explaining the manner of arranging emission points of a plurality of pieces of laser light.

FIG. 10A illustrates the three laser light sources 151, 152, and 153 and the optical waveguide element 154 illustrated in FIG. 2 as described above.

As illustrated in FIG. 10B, the emission points of the optical waveguide elements may be arranged in the same direction as the non-resonant axial direction of the scanning mirror 104. In this case, since the plurality of emission points is arranged in the non-resonant axial direction, the video regions drawn by the laser light emitted from these emission points are shifted in the non-resonant axial direc-tion. This shift can be coped with by the technique described in (4) below. Furthermore, this shift can be coped with by buffering the video data.

Furthermore, as illustrated in FIG. 10C, the emission points of the optical waveguide elements may be arranged in the same direction as the resonant axial direction of the scanning mirror 104. In this case, since the plurality of emission points is arranged in the resonant axial direction, the video regions drawn by the laser light emitted from these emission points are shifted in the resonant axial direction. In this case, the shift in the non-resonant axial direction described above with reference to FIG. 10B does not occur. Therefore, the number of buffers of the video data may be smaller than that in a case where the emission points are arranged in the non-resonant axial direction.

In a case where the plurality of emission points is arranged in the non-resonant axial direction and the drawing region includes one region in which the scanning lines are minute and two regions sandwiching the region and in which the scanning lines are coarse as in the frame F described in FIG. 2, the drawing region can be drawn by three emission points as illustrated in FIG. 10B.

On the other hand, in a case where the plurality of emission points is arranged in the resonant axial direction and the drawing region includes one region in which the scanning lines are minute and two regions sandwiching the region and in which the scanning lines are coarse, the drawing region can be drawn by two emission points as illustrated in FIG. 10C.

(2) Laser Light Source Unit Including Collimator Lens

Figure 6:
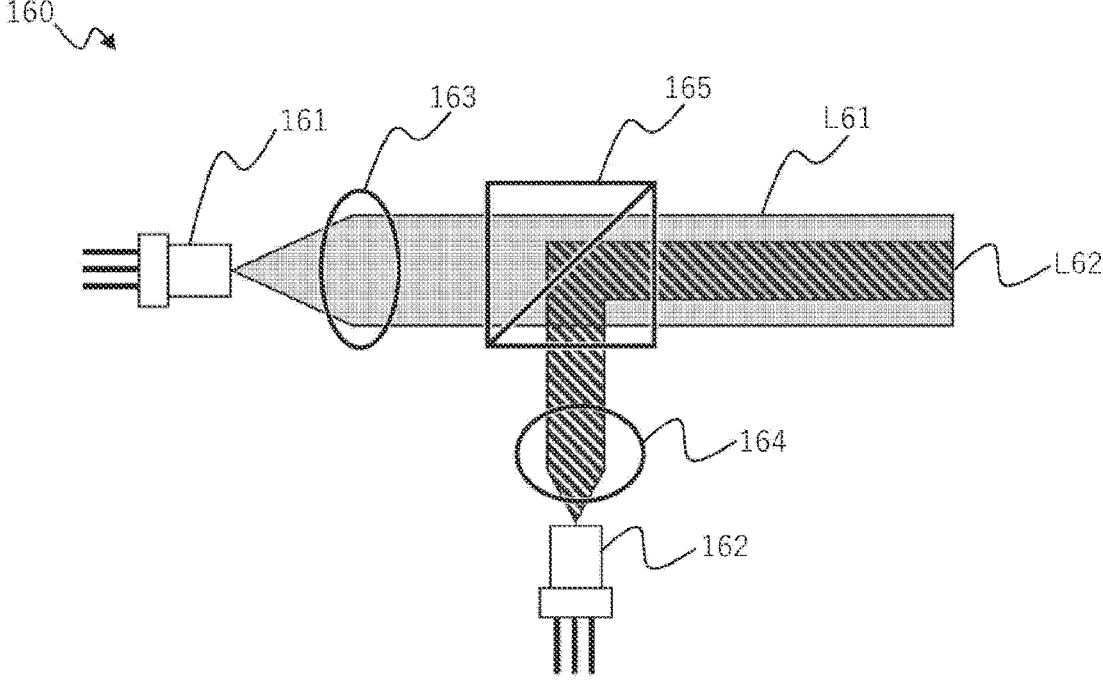
FIG. 6 is a diagram illustrating an example of the laser light source unit configured to be able to emit pieces of laser light having different beam sizes by a collimator lens.

The emission of two or more pieces of laser light having different beam sizes may be achieved by components other than the optical waveguide. For example, two or more collimator lenses having different focal lengths allow the laser light source unit to emit two or more pieces of laser light having different beam sizes. This example will be described with reference to FIG. 6. FIG. 6 illustrates an example of the laser light source unit configured to be able to emit pieces of laser light having different beam sizes by a collimator lens.

The laser light source unit 160 illustrated in FIG. 6 includes laser light sources 161 and 162. Laser light L61 emitted from the laser light source 161 and laser light L62 emitted from the laser light source 162 are configured to reach the same scanning mirror (not illustrated) by an optical element (for example, a beam splitter or a polarizing beam splitter) 165.

Here, a collimator lens 163 is provided on an optical path between the laser light emission point of the laser light source 161 and the optical element 165, and a collimator lens 164 is provided on an optical path between the laser light emission point of the laser light source 162 and the optical element 165.

A focal length f1 of the collimator lens 163 is different from a focal length f2 of the collimator lens 164. As a result, the laser light L61 collimated by the collimator lens 163 and the laser light L62 collimated by the collimator lens 164 have different beam sizes, and the beam size of the laser light L61 is larger than the beam size of the laser light L62.

While the laser light source 161 emits the laser light L61, the emission of the laser light L62 by the laser light source 162 is stopped. On the other hand, while the laser light source 162 emits the laser light L62, the emission of the laser light L61 by the laser light source 161 is stopped. The laser light source drive unit may drive these laser light sources so that such emission and/or stop is performed. This enables emission of two or more pieces of laser light having different beam sizes.

As described above, the laser light source unit included in the display device of the present disclosure may include two or more collimator lenses having different focal lengths. The laser light source unit may be configured such that the two or more collimating lenses collimate the pieces of laser light emitted from the two or more laser light sources such that the pieces of laser light have beam sizes different from each other.

(3) Switching of Number of Pieces of Emitted Laser Light

The laser light source unit included in the display device of the present disclosure may be configured to be able to emit two or more pieces of laser light and switch the number of pieces of laser light to be emitted. The laser light source unit configured as described above can also cope with the coarseness and minuteness of the scanning lines. Here, the beam sizes of the two or more pieces of laser light may be the same. An example of the laser light source unit configured as described above will be described with reference to FIGS. 7A and 7B.

Figures 7A, 7B, 8:
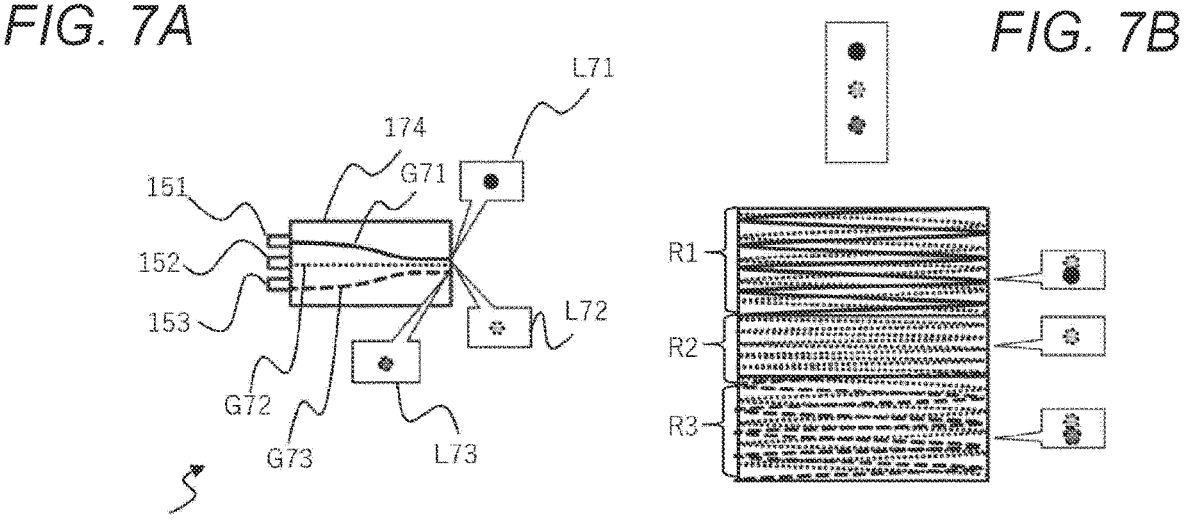
FIG. 7A is a diagram illustrating an example of the laser light source unit configured to be able to switch the number of pieces of laser light.
FIG. 7B is a diagram illustrating an example of the laser light source unit configured to be able to switch the number of pieces of laser light.
FIG. 8 is a schematic view of an example of a display device of the present disclosure configured as an eyeglasses type display device.

The laser light source unit 170 illustrated in FIG. 7A includes three laser light sources 151, 152, and 153 and an optical waveguide element 174. The optical waveguide element 174 includes three optical waveguides G71, G72, and G73. The laser light emitted from the laser light sources 151, 152, and 153 is connected to each of these three optical waveguides so as to be incident thereon. The sizes of the emission points on the emission surfaces of these three optical waveguides are the same. That is, the pieces of laser light L71, L72, and L73 emitted from these three optical waveguides all have the same beam size.

For example, as illustrated in FIG. 7B, two pieces of laser light L1 and L2 are emitted in order to draw the region R1 in which the scanning lines are coarse. These two pieces of laser light stick to each other at the time of reaching the projection surface (retina) as illustrated in the drawing. That is, one scanning line is drawn by the two pieces of laser light.

Next, one piece of laser light L2 is emitted in order to draw the region R2 in which the scanning lines are minute.

Lastly, two pieces of laser light L2 and L3 are emitted in order to draw the region R3 in which the scanning lines are coarse. These two pieces of laser light stick to each other at the time of reaching the projection surface (retina) as illustrated in the drawing. That is, one scanning line is drawn by the two pieces of laser light.

As described above, regarding the laser light source unit that emits a plurality of pieces of laser light having the same beam size, it is possible to cope with the coarseness and minuteness of the scanning lines as described above by switching the number of pieces of laser light to be emitted.

As described above, the optical waveguide element includes two or more emission points of the same size, and in a case where two or more different non-resonant axial direction scanning speeds are used in a drawing region of one frame of a video, the laser light source drive unit may change the number of pieces of the laser light emitted from the laser light source unit according to the interval of the scanning lines.

For example, the laser light source unit may be configured to be able to emit two or more pieces of laser light and to be able to switch the number of pieces of laser light to be emitted, and the laser light source drive unit may control the laser light source unit to emit a smaller number of pieces of laser light in a case of drawing a region where a slower non-resonant axial direction scanning speed is used.

(4) Scanning Mirror and Scanning Mirror Drive Unit

The scanning mirror 104 scans laser light emitted from the drawing system 101 (in particular, the laser light source unit 115). As a result of the scanning, a video image is formed. The scanning cycle of the scanning mirror 104 may be synchronized with the video signal input from the information processing device 120.

For example, the scanning mirror 104 may be a micro electro mechanical systems (MEMS) mirror. As the MEMS mirror, a commercially available MEMS mirror may be used, or a MEMS mirror manufactured by a method known in the art may be used. MEMS mirrors may be typically fabricated by microfabrication technologies of semiconductor processes. The MEMS mirror scans light by resonance of a minute mirror of about Φ1 mm.

The scanning mirror 104 may be a scanning mirror operable in two axial directions, or may be a combination of two scanning mirrors capable of scanning in one axial direction. As a result, a two-dimensional image can be projected.

The scanning mirror 104 may be either a scanning mirror of an electrostatic method or a scanning mirror of an electromagnetic driving method. In any of these methods, the scanning mirror is driven in the resonant axial direction and the non-resonant axial direction perpendicular thereto. Scanning in the non-resonant axial direction is performed by applying a voltage to the scanning mirror.

The scanning mirror drive unit 113 outputs a drive signal for driving the scanning mirror 104. The scanning mirror drive unit 113 may include, for example, a D/A converter that converts a digital signal from the video processing unit 112 into an analog signal. The scanning mirror drive unit 113 may further include an operational amplifier that amplifies the output signal generated by the conversion to a drive voltage level of the scanning mirror 104.

In a case where two or more mutually different non-resonant axial direction scanning speeds (particularly two or more mutually different constant non-resonant axial direction scanning speeds) are used in a drawing region of one frame of a video formed by laser light scanning, the scanning mirror drive unit 113 changes the non-resonant axial direction scanning speed by changing a drive voltage of the scanning mirror 104. By this change, a region where the scanning speed is high (the scanning lines are sparse) and a region where the scanning speed is low (the scanning lines are minute) are formed.

Figure 3:
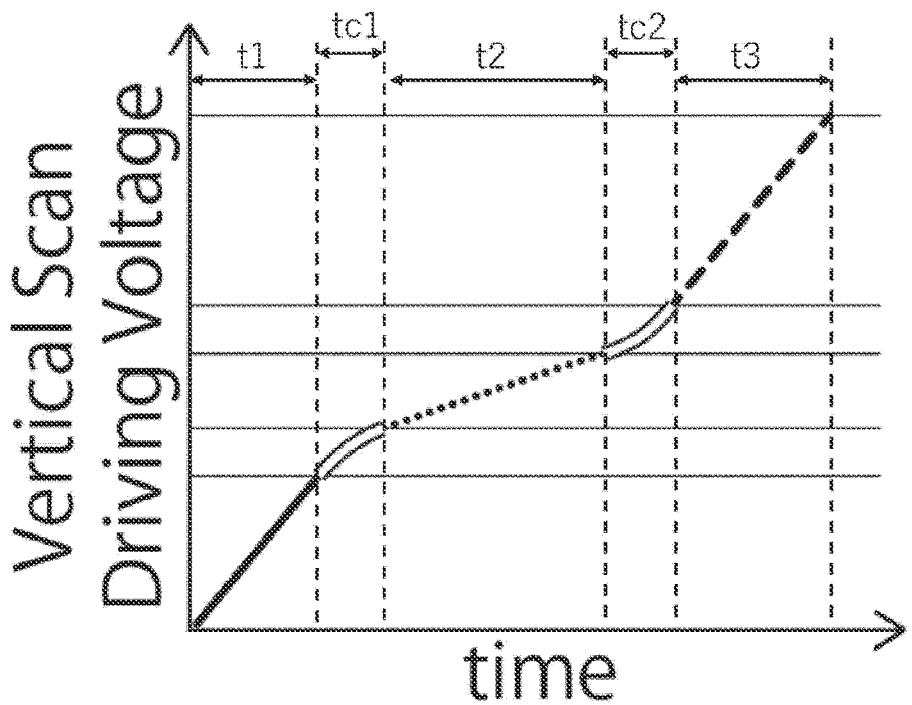
FIG. 3 is a schematic graph illustrating a change with time of a drive voltage for scanning in a non-resonant axial direction of a scanning mirror in a drawing region of one frame.

In the present disclosure, for example, as illustrated in FIG. 3, the scanning speed in the non-resonant axial direction is changed by changing the drive voltage of the scanning mirror, and a region in which the scanning speed is high (scanning lines are sparse) and a region in which the scanning speed is low (scanning lines are minute) are formed. Hereinafter, FIG. 3 will be described with reference to FIG. 2.

FIG. 3 illustrates a schematic graph illustrating a change with time of a drive voltage for scanning in a non-resonant axial direction of a scanning mirror in a drawing region of one frame. The time indicated by t1 in FIG. 3 corresponds to the time for drawing the region R1 in the frame F in FIG. 2. As similar to this, the time indicated by t2 and t3 in FIG. 3 corresponds to the time for drawing the regions R2 and R3 in the frame F in FIG. 2. As described above, the scanning lines that draw the regions R1 and R3 are coarse, and the scanning lines that draw the region R2 are minute.

As illustrated in FIG. 3, the drive voltage of the scanning mirror linearly changes at times t1, t2, and t3 (that is, in a case where the regions R1 and R3 are drawn). That is, the scanning speed of the scanning mirror in the non-resonant axial direction in a case of drawing these regions is constant.

Furthermore, the inclination of the graph at time t1 and time t3 (that is, in a case of drawing the regions R1 and R3) is smaller than the inclination of the graph at time t2 (that is, in a case of drawing the region R2). That is, the scanning speed in the non-resonant axial direction at times t1 and t3 is faster than the scanning speed in the non-resonant axial direction at time t2. As a result, in the region R2, the scanning lines are minute, and in a case of drawing the regions R1 and R3, the scanning lines are coarse.

Here, as described above, the laser light is emitted from each of the laser light sources 151, 152, and 153 in order to draw the regions R1, R2, and R3. Here, the beam size of the laser light emitted from the laser light source 152 to draw the region R2 is smaller than the laser light emitted from another laser light source when reaching the retina as described above. Therefore, it is possible to prevent image quality degradation due to coarseness and minuteness of the scanning lines while improving the image quality only for the region including the fovea.

However, as illustrated in FIG. 3, time tc1 and time tc2 at which the scanning speed changes exist between time t1 and time t2 and between time t2 and time t3, respectively. At time tc1 and time tc2, the graph of the drive voltage draws non-linearity, for example, as illustrated in the drawing. At time tc1 and time tc2, the non-resonant axial direction scanning speed is not constant. Therefore, a laser light source having an appropriate beam size cannot be selected. Moreover, at time tc1 and time tc2, unnecessary vibration of the scanning mirror may occur as described above.

The display device 100 according to the present disclosure may stop laser irradiation by the laser light source unit 115 at time tc1 and the time tc2 when the scanning speed changes (for example, the emission of all the pieces of laser light included in the laser light source unit 115 may be stopped). As a result, it is possible to prevent laser light having an inappropriate beam size from being emitted, and moreover, the occurrence of the unnecessary vibration is prevented.

In order to execute the stop, the laser light source drive unit 114 may stop the emission of the laser light by the laser light source unit 115 according to a signal received from the video processing unit 112, for example. More specifically, for example, in the drawing region of the frame F, control is performed as follows.

At time t1, in order to draw the region R1, the laser light source drive unit 114 causes the laser light source 151 to emit the laser light, and stops the laser light emission from the laser light sources 152 and 153.

Next, at time tc1, the laser light source drive unit 114 stops the laser light emission by the laser light source 151. At time tc1, the laser light emission from the laser light sources 152 and 153 is continuously stopped after time t1. That is, at time tc1, the laser light emission by all the laser light sources is stopped.

Next, at time t2, the laser light source drive unit 114 causes the laser light source 152 to emit laser light in order to draw the region R2. At time t2, the laser light emission by the laser light sources 151 and 153 is stopped following time tc1.

Next, at time tc2, the laser light source drive unit 114 stops the laser light emission by the laser light source 152. At time tc2, the laser light emission from the laser light sources 151 and 153 is continuously stopped after time t2. That is, at time tc2, the laser light emission by all the laser light sources is stopped.

Lastly, at time t3, the laser light source drive unit 114 causes the laser light source 153 to emit laser light in order to draw the region R3. At time t3, the laser light emission by the laser light sources 151 and 152 is stopped following time t2.

As described above, the laser light source drive unit included in the display device of the present disclosure may stop the emission of the laser light by the laser light source unit while the non-resonant axial direction scanning speed changes in the drawing region of one frame.

Figure 4:
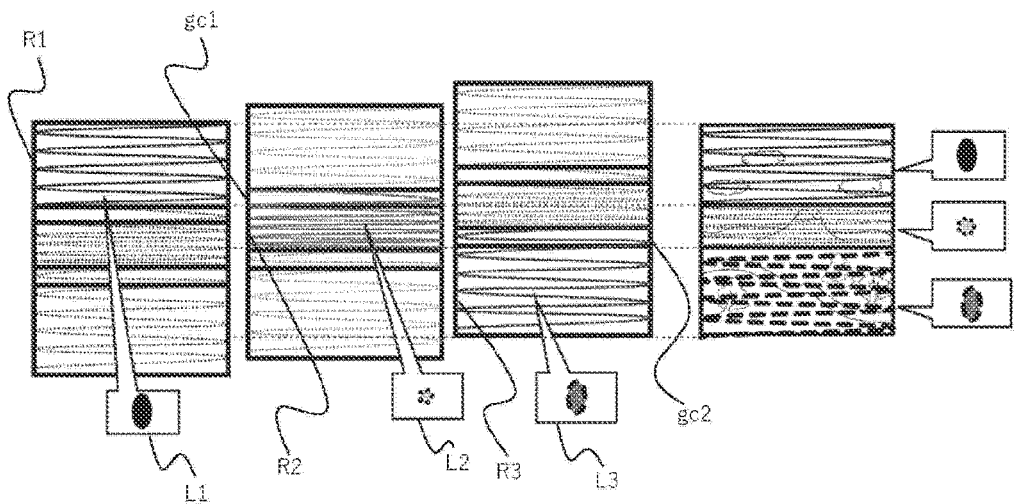
FIG. 4 is a diagram for explaining that a gap is generated in one frame by stopping laser light emission.

Note that when the operation of stopping the emission of the laser light by the laser light source unit in the drawing region of one frame is performed by one light emission point (for example, one laser light source), for example, as illustrated in FIG. 4, gaps gc1 and gc2 are generated in the video of one frame by the stop of the emission of the laser light.

Therefore, the three emission points Out1, Out2, and Out3 of the optical waveguide element 154 are arranged on the laser light emission surface of the optical waveguide element 154 so as not to generate these gaps.

More specifically, the emission points Out1 and Out2 are spaced such that "an angle of view in the non-resonant axial direction of the laser light L1 immediately before time tc1 (that is, the last time point in time t1)" and "an angle of view in the non-resonant axial direction of the laser light L2 immediately after time tc1 (that is, the first time point in time t2)" match.

Furthermore, the emission points Out2 and Out3 are spaced such that "an angle of view in the non-resonant axial direction of the laser light L2 immediately before time tc2 (that is, the last time point in time t2)" and "an angle of view in the non-resonant axial direction of the laser light L3 immediately after time tc2 (that is, the first time point in time t3)" match.

Since the emission points Out1, Out2, and Out3 are arranged on the laser light emission surface of the optical waveguide element 154 as described above, the generation of the gap described above can be prevented.

As described above, in the present disclosure, the two or more emission points of the optical waveguide element may be spaced apart such that an angle of view (hereinafter, also referred to as an "angle of view immediately before the stop period") of the laser light in the non-resonant axial direction immediately before a stop period of emission of the laser light matches an angle of view (hereinafter, also referred to as an "angle of view immediately after the stop period") of the laser light in the non-resonant axial direction immediately after the stop period of emission of the laser light.

The scanning angle of the scanning mirror 104 and/or the focal length of the collimator lens 103 may be adjusted in order to match the angle of view immediately before the stop period with the angle of view immediately after the stop period described above. That is, the angle of view immediately before the stop period and the angle of view immediately after the stop period can be made to match each other by adjusting one, two, or three of the three elements of the interval between the two or more laser light emission points, the scanning angle of the scanning mirror, and the focal length of the collimator lens.

Specifically, when a scanning angle of the scanning mirror 104 during the stop period is denoted by "$\Delta$", an interval between an emission point of the laser light emitted immediately before the stop period and an emission point of the laser light immediately after the stop period is denoted by "d", and a focal length of the collimator lens is denoted by "f", $\Delta$, d, and f may be set so as to satisfy the following expression.

Expression: $\Delta = \arctan(d/2f)$

For example, in a case where the scanning angle A of the scanning mirror is 0.5° and the focal length f is 3 mm, the emission point interval d on the laser light emission surface of the optical waveguide element is 52 μm in order to satisfy the above expression.

Note that, assuming that the vertical angle of view V is 40° and the number of scanning lines is 700, the scanning line interval of the scanning mirrors is 40/700=0.057°. When this is converted into the interval between the emission points, it is about 3 Therefore, in order to present a seamless video, accuracy within 3 μm is required in the design of the optical waveguide element. Since the optical waveguide element is manufactured by a semiconductor manufacturing process, the emission point can be formed with accuracy on the order of sub-μm. Therefore, the required accuracy can be satisfied.

Furthermore, the optical waveguide element is also excellent in environmental resistance, and is also resistant to the influence caused by environmental changes.

Moreover, a plurality of optical waveguides can be integrated in one optical waveguide element, and for example, the volume of the optical waveguide element can be 1 cc or less. As a result, the display device can be downsized.

As described above, the optical waveguide element is particularly suitable for matching the angle of view immediately before the stop period with the angle of view immediately after the stop period as described above.

(5) Optical Waveguide Element Including Switching Unit

In a case where the display device of the present disclosure includes an optical waveguide element, the optical waveguide element may include a switching unit that switches an emission point of the laser light incident from the incident port. The switching unit may include, for example, at least one optical switch (for example, one, two, three or four optical switches), and more specifically, may include a Mach-Zehnder type optical switch. The optical switch includes, for example, a directional coupler.

By the switching unit, the number of laser light sources included in the laser light source unit is not necessarily the same as the number of emission points of the optical waveguide element. For example, the number of laser light sources included in the laser light source unit may be smaller than the number of emission points, and may be one, for example.

An example of the optical waveguide element including the switching unit will be described with reference to FIGS. 5A and 5B.

Figure 5A:
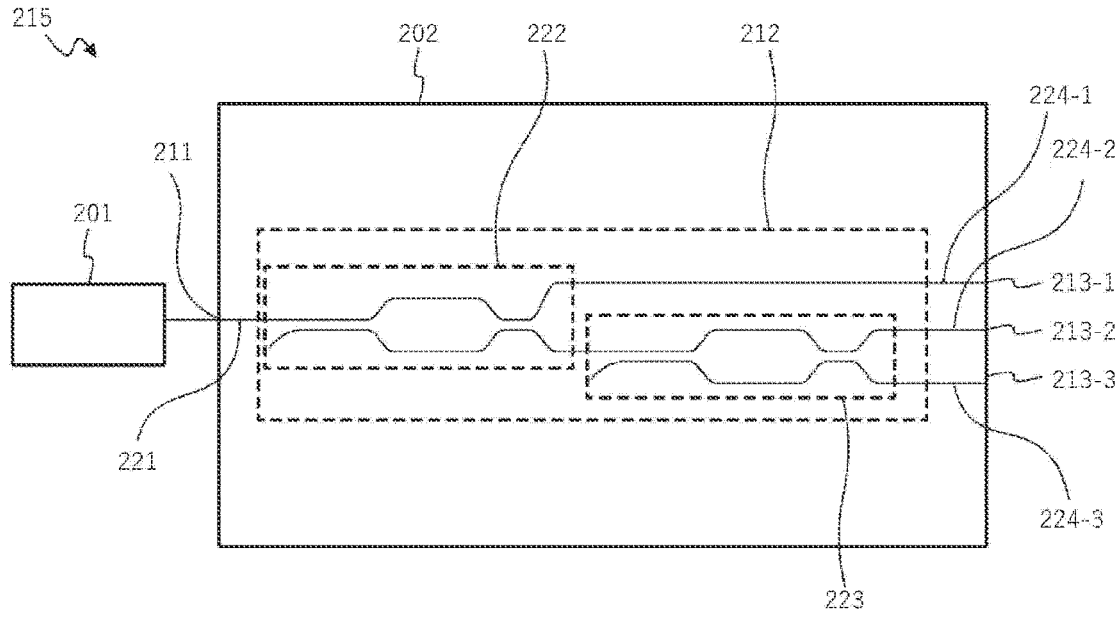
FIG. 5A is a diagram illustrating an example of an optical waveguide element.
Figure 5B:
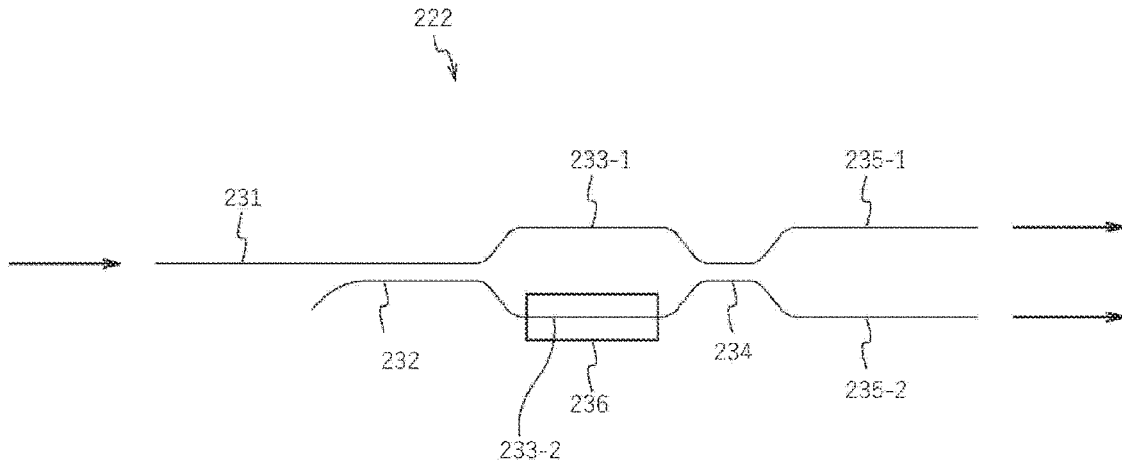
FIG. 5B is a diagram illustrating an example of an optical waveguide element.

The optical waveguide element 215 illustrated in FIG. 5A has one incident port 211 on which the laser light emitted from the laser light source 201 is incident, and three emission points 213-1, 213-2, and 213-3 from which the laser light is emitted. In the present disclosure, an optical waveguide element having such a plurality of emission points and a smaller number of incident ports than the emission points may be used.

The three emission points 213-1, 213-2, and 213-3 may be provided at different positions of the optical waveguide element 202, for example. For example, the three emission points may be arranged in this order on one outer surface of the optical waveguide element 202. These emission points may be arranged in the same direction as the non-resonant axial direction of the scanning mirror 104, or may be arranged in the same direction as the resonant axial direction of the scanning mirror 104.

Among these three emission points, the sizes of the emission points 213-1 and 213-3 may be smaller than the size of the emission point 213-2. As a result, the beam size of the laser light emitted from the emission points 213-1 and 213-3 becomes smaller than the beam size of the laser light emitted from emission point 213-2. The magnitude relationship between these beam sizes is opposite at the time of reaching the retina by the retina direct drawing type display device 100, that is, at the time of reaching the retina, the beam sizes of pieces of laser light emitted from the emission points 213-1 and 213-3 are larger than the beam size of laser light emitted from the emission point 213-2. As a result, it is possible to deal with coarseness and minuteness of the interval of the scanning lines.

The manner of arranging the three emission points may be appropriately selected according to the purpose. For example, the three emission points may be arranged at intervals as described above.

The optical waveguide element 202 includes an input optical waveguide 221, a switching unit 212, and output optical waveguides 224-1, 224-2, and 224-3.

The input optical waveguide 221 is configured to guide the laser light incident from the incident port 211 to the switching unit 212.

The switching unit 212 switches an emission point at which the laser light incident from the incident port 211 is emitted. For example, the switching unit 212 switches the emission point from which the laser light is emitted from the emission point 213-1 to any of the other emission points, from the emission point 213-2 to any of the other emission points, or from the emission point 213-3 to any of the other emission points. The switching unit 212 switches the output destination of the laser light and emits the laser light from one of the three emission points. This makes it possible to switch the emission point from which the laser light is emitted.

The switching unit 212 includes two Mach-Zehnder type optical switches 222 and 223. By controlling these two optical switches, it is possible to switch emission points at which the laser light is emitted.

These optical switches will be described below with reference to FIG. 5B. The optical switch 222 illustrated in FIG. 5B includes directional couplers 232 and 234, and two arm waveguides 233-1 and 233-2 connecting these two directional couplers. The phase of the arm waveguide 233-2 can be controlled by the phase control unit 236. The phase control unit 236 may be, for example, a heater, particularly, a thin film heater. By heating the arm waveguide 233-2 with the heater, the phase difference between the arm waveguide 233-1 and the arm waveguide 233-2 can be controlled.

The amount of the laser light incident on the input optical waveguide 231 is separated into 1:1 by the directional coupler 232, and the separated pieces of light travel to the arm waveguides 233-1 and 233-2, respectively. The separated light is multiplexed by the directional coupler 234. By changing the phase of one of the separated pieces of light by the phase control unit 236, it is possible to control which one of the output optical waveguides 235-1 and 235-2 the light multiplexed by the directional coupler 234 travels to.

The phase control unit 236 may be controlled by an optical switch driver (not illustrated). The optical switch driver may switch on or off the heater constituting the phase control unit 236, for example. The optical switch driver may be controlled by the video processing unit 112, for example.

As an optical waveguide element including such an optical switch, a commercially available optical waveguide element may be used, or an optical waveguide element manufactured by a method known in the art may be used.

The above description also applies to the optical switch 223.

(6) Multiplexing Pieces of Laser Light of Plurality of Colors

Furthermore, in the present disclosure, the laser light source unit may be configured to emit a monochromatic laser, and alternatively, the laser light source unit may be configured to emit laser light in which pieces of laser light of a plurality of colors are multiplexed. In the latter case, the laser light source unit may be configured such that, for example, after pieces of laser light of a plurality of wavelengths are multiplexed, the multiplexed laser light is incident on the optical waveguide element, or may be configured such that pieces of laser light of a plurality of wavelengths are multiplexed in the optical waveguide element. The pieces of laser light of a plurality of colors may be, for example, red, green, and blue laser light. The number of laser light sources included in the laser light source unit may be, for example, 2 to 5, and may be particularly 2, 3 or 4.

An example of the laser light source unit configured such that the multiplexed laser light is incident on the optical waveguide element after the pieces of laser light of the plurality of wavelengths are multiplexed will be described below with reference to FIG. 5C.

Figure 5C:
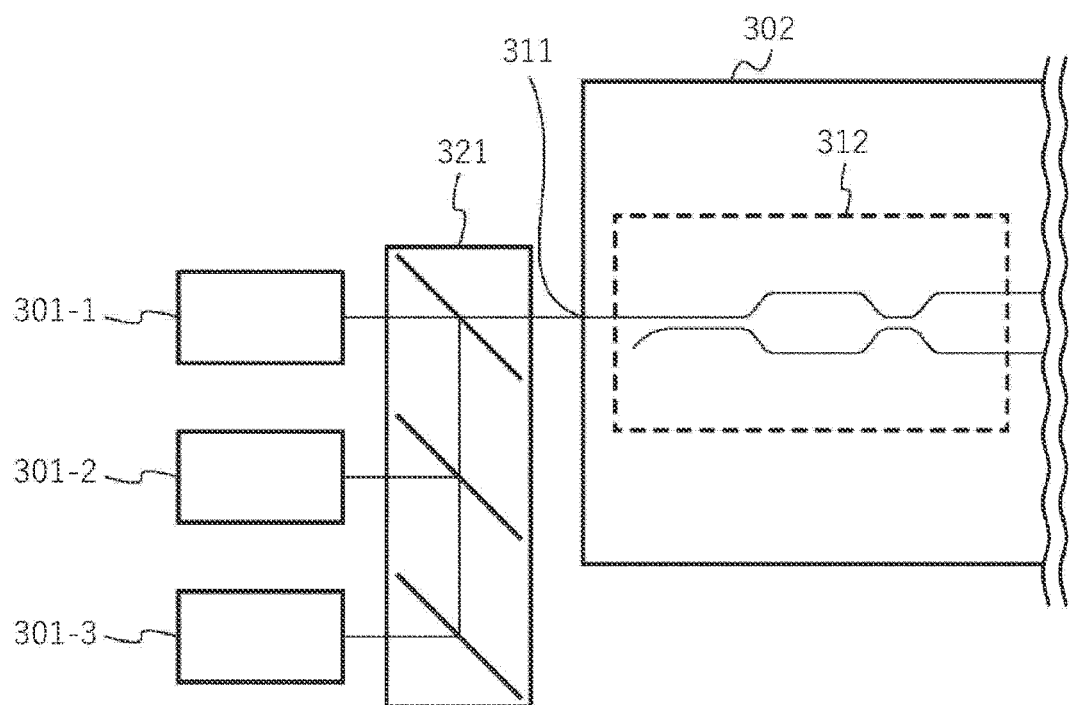
FIG. 5C is a diagram for explaining a light switch.

FIG. 5C illustrates an example in which the three laser light sources 301-1, 301-2, and 301-3 and the optical waveguide element 302 are connected. The laser light sources 301-1, 301-2, and 301-3 may be laser light sources of red, blue, and green, respectively. The three pieces of laser light emitted from these laser light sources are multiplexed by the multiplexing unit 321. The multiplexing unit 321 may include, for example, a dichroic mirror and/or a polarization beam splitter. The configuration of the multiplexing unit 321 (for example, components (for example, a dichroic mirror and/or a polarization beam splitter) included in the multiplexing unit 321 and their arrangement) may be appropriately set by those skilled in the art according to, for example, the arrangement of the laser light source and the position of the incident port. The three pieces of laser light are multiplexed by the multiplexing unit 321, and the multiplexed laser light is incident on the incident port 311 of the optical waveguide element 302. The laser light incident from the incident port 311 travels to the optical switch 312 of the switching unit. The configuration of the optical switch 312 may be as described above with reference to FIG. 5B.

As described above, the laser light source unit included in the display device of the present disclosure may include a plurality of laser light sources, a multiplexing unit that multiplexes a plurality of pieces of laser light emitted from the plurality of laser light sources, and an optical waveguide element on which the laser light multiplexed by the multiplexing unit is incident.

Next, an example of a laser light source unit configured such that pieces of laser light of a plurality of wavelengths are multiplexed in the optical waveguide element will be described below with reference to FIG. 5D.

Figure 5D:
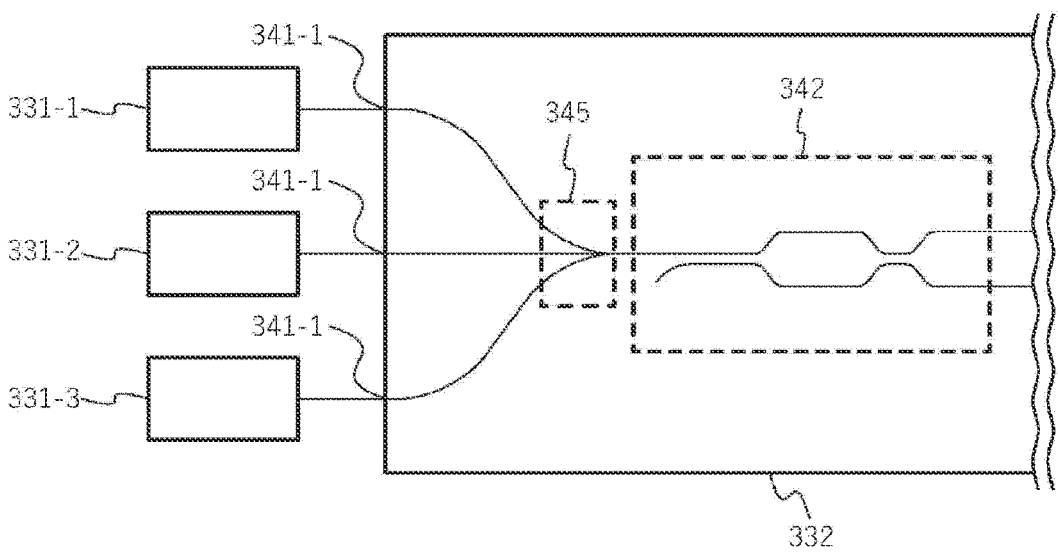
FIG. 5D is a diagram illustrating an example of the laser light source unit.

FIG. 5D illustrates an example in which the three laser light sources 331-1, 331-2, and 331-3 and the optical waveguide element 332 are connected. The laser light sources 331-1, 331-2, and 331-3 may be laser light sources of red, blue, and green, respectively. The three pieces of laser light emitted from the laser light sources 331-1, 331-2, and 331-3 are incident on the three incident ports 341-1, 341-2, and 341-3 of the optical waveguide element 332, respectively. The pieces of laser light incident from the incident ports 341-1, 341-2, and 341-3 are multiplexed by the multiplexing unit 345 in the optical waveguide element 332. Then, the multiplexed laser light travels to the optical switch 342 of the switching unit. The optical switch 342 may be as described above with reference to FIG. 5B.

As described above, the laser light source unit included in the display device of the present disclosure may include a plurality of laser light sources and may include an optical waveguide element having a plurality of incident ports. The optical waveguide element may include a multiplexing unit that multiplexes the pieces of laser light incident from the plurality of incident ports. The laser light multiplexed by the multiplexing unit travels to the switching unit in the optical waveguide element. The waveguide constituting the multiplexing unit may be appropriately designed by a person skilled in the art.

By providing the multiplexing unit in the optical waveguide element, the switching unit and the multiplexing unit are integrated in the optical waveguide element. As a result, the display device can be downsized. Furthermore, since a plurality of pieces of laser light is emitted from one emission port, color deviation can be eliminated.

(7) Line-of-Sight Detection Unit

The line-of-sight detection unit 102 may be configured to detect a line-of-sight of the user of the display device 100. The line-of-sight detection unit 102 may be configured to detect a line-of-sight on the basis of corneal reflection, or may be configured to detect a line-of-sight on the basis of a three-dimensional eyeball model. In the former case, the line-of-sight detection unit may include, for example, a light source (for example, an LED) configured to emit infrared light (particularly, near-infrared light) toward the eyeball, and an imaging element that acquires an image by the irradiation. In the latter case, the line-of-sight detection unit includes an imaging element configured to acquire a face image of a user of the display device. The line-of-sight is detected on the basis of the information regarding the eyeball obtained by analyzing the face image. The line-of-sight specifying processing based on the image acquired by the imaging element may be performed by, for example, an information processing unit included in the line-of-sight detection unit 102.

The line-of-sight detection unit 102 may transmit information regarding the specified line-of-sight to the drawing system 101 and/or the information processing device 120. The drawing system 101 and/or the information processing device 120 can adjust the video to be presented to the user on the basis of the information regarding the line-of-sight.

For example, the video processing unit 112 of the drawing system 101 can perform the Foveated rendering on the basis of the information regarding the line-of-sight. More specifically, the video processing unit 112 controls the non-resonant axial direction scanning speed of the scanning mirror 104 on the basis of the information regarding the line-of-sight. For example, the video processing unit 112 controls the scanning mirror drive unit 113 such that there are a constant scanning speed section in which scanning is performed at two or more different scanning speeds and a section in which the scanning speed gradually changes between the different scanning speed sections. For example, the video processing unit 112 controls the scanning mirror drive unit 113 so that the change in the driving voltage (and the change in the scanning speed due to the change) described above with reference to FIG. 3 is performed, and the scanning mirror drive unit 113 drives the scanning mirror 104 according to the control.

Preferably, the line-of-sight detection unit 102 may be configured to specify a region including the fovea on the basis of the detected line-of-sight. In the present specification, the region including the fovea may correspond to the region R2 where the scanning line intervals are minute as described above.

The line-of-sight detection unit 102 transmits information regarding the specified region including the fovea to the drawing system 101 (in particular, the video processing unit 112). The scanning mirror drive unit 113 may drive the scanning mirror on the basis of the region including the fovea specified by the line-of-sight detection unit.

Furthermore, the line-of-sight detection unit 102 may transmit information regarding the specified region including the fovea to the information processing device 120. The information processing device 120 can adjust the video signal to be transmitted to the display device 100 on the basis of the information.

The video processing unit 112 may specify the regions R1, R2, and R3 on the basis of the region including the fovea. Alternatively, the specification may be performed by the line-of-sight detection unit 102 or may be performed by the information processing device 120.

The specification may be performed for each frame. This enables video processing according to the user's line-of-sight.

As described above, in the display device 100 of the present disclosure, the video processing unit 112 may specify the region including the fovea and one or more regions not including the fovea in the drawing region of one frame on the basis of the information regarding the line-of-sight (particularly, the information regarding the region including the fovea). Moreover, the video processing unit 112 may assign a slower non-resonant axial direction scanning speed to the region including the fovea, and assign a faster non-resonant axial direction scanning speed to one or more regions not including the fovea. Based on these assignments, the scanning mirror drive unit 113 may drive the scanning mirror 104.

Moreover, the video processing unit 112 may select a laser light source to be driven to draw each of these three regions. The video processing unit 112 may select the laser light source 151 for the region R1, the laser light source 152 for the region R2, and the laser light source 153 for the region R3, for example. Alternatively, the selection may be performed by the line-of-sight detection unit 102 or may be performed by the information processing device 120.

As described above, in the display device 100 of the present disclosure, the video processing unit 112 may specify the region including the fovea and one or more regions not including the fovea in the drawing region of one frame on the basis of the information regarding the line-of-sight (particularly, the information regarding the region including the fovea). Moreover, the video processing unit 112 may assign a laser light source having a smaller beam size to the region including the fovea, and may assign a laser light source having a larger beam size to one or more regions not including the fovea. Based on these assignments, the laser light source drive unit 114 may drive the scanning mirror 1015.

(8) Other Components

The collimator lens 103 converts laser light emitted from the drawing system 101 (in particular, the laser light source units 116 and 117) into parallel light. The emitted laser light may be divergent light. Meanwhile, the light projected onto the retina of the eyeball 107 is desirably parallel light. Therefore, the collimator lens 103 converts the laser light into parallel light, so that more preferable image projection can be performed.

The relay lens 105 may be appropriately selected by those skilled in the art depending on the shape and/or structure of the display device 100. For example, the optical system can be downsized by the relay lens 105.

The hologram element 106 is also called, for example, a holographic optical element, and condenses the laser light scanned by the scanning mirror 104 near the pupil to reach the retina. The hologram element 106 may be, for example, a volume hologram component. For example, the hologram element 106 may diffract light having a specific wavelength and a specific incident angle such that the light is condensed near the pupil. The hologram element 106 may have characteristics of both polarized light and a lens.

As illustrated in FIG. 1A, the light diffracted by the hologram element 106 is condensed in the vicinity of the pupil 108 in the eyeball 107 and then applied to the retina. That is, the display device 100 can present a video to the user in a so-called Maxwellian view.

The display device 100 may further include, for example, various components used for video projection, such as a disk, a communication device, and a drive. The disk may store, for example, various video data and various programs such as a program for achieving video projection by the display device 100. The communication device may acquire a program and/or video data for controlling the display device 100, from a network, for example. The drive may read out a program and/or video data recorded on, for example, a recording medium such as a microSD memory card and an SD memory card, and output to the RAM.

The display device 100 may be configured as, for example, a head mounted type display (head mounted display, hereinafter, also referred to as HMD). The head mounted type display may be, for example, a transmissive HMD or a non-transmissive HMD.

The transmissive HMD can be configured as, for example, an eyeglasses type display. In this case, the hologram element 106 can transmit light from the outside view to reach the eye. The hologram element 106 may be provided in a portion corresponding to a lens of eyeglasses. The video presented by the display device 100 can be superimposed on the outside view by the transmissive HMD, and for example, AR can be provided to the user.

The non-transmissive HMD may completely cover both eyes, for example. In this case, light from the outside view does not reach the eyes.

FIG. 8 illustrates a schematic view of a display device of the present disclosure configured as an eyeglasses type display device. As illustrated in FIG. 8, in the display device 100, the scanning mirror 104 is also housed in a housing in which the drawing system 101 is housed. As illustrated in FIG. 8, the drawing system 101 includes three laser light sources (for example, laser light sources of pieces of light of three colors of red, green, and blue) and an optical element group (for example, a reflection mirror and a dichroic mirror) that multiplexes pieces of laser light emitted from the laser light sources. The multiplexed laser light (for example, white laser light) is scanned by the scanning mirror 104. The laser light scanned by the scanning mirror 104 reaches the hologram element 106 via the relay lens 105.

As illustrated in FIG. 8, the hologram element 106 is disposed in front of the eyeball 107 of the user. The hologram element 106 may be disposed in a portion corresponding to a lens of eyeglasses, for example. The hologram element 106 diffracts the scanned laser light toward the eyeball 107. The hologram element 106 diffracts the scanned laser light so that the scanned laser light is condensed near the pupil and reaches the retina. The scanned laser light reaches the retina without being refracted by the crystalline lens of the eyeball 107. As a result, the video is presented by Maxwellian viewing.

The line-of-sight detection unit 102 included in the display device 100 may be disposed so as to detect the information regarding the line-of-sight from the eyeball 107, and may be disposed, for example, in a portion corresponding to a rim, a lens, or a wraparound endpiece of eyeglasses.

As illustrated in FIG. 8, the set of components described above is provided to perform the video presentation and the line-of-sight detection also for the other eyeball of the user. Note that the display device of the present disclosure may be configured to perform the video presentation (and optionally the line-of-sight detection) for both eyes as described above, or may be configured to perform the video presentation (and optionally the line-of-sight detection) for one eye.

3. Second Embodiment of Present Disclosure (Projector)

According to another embodiment of the present disclosure, the display device may cause the laser light scanned by the scanning mirror to reach the projection surface without through the projection optical system or through the projection optical system. The display device may be configured as, for example, a small projector (also referred to as a pico projector).

Hereinafter, an example of the display device according to this embodiment will be described with reference to FIG. 9.

FIG. 9 illustrates a configuration example of a display device 300 according to the present disclosure. The display device 300 includes a drawing system 301, a line-of-sight detection unit 302, a collimator lens 303, and a scanning mirror 304. These components included in the display device 300 may be the same as the drawing system 101, the line-of-sight detection unit 102, the collimator lens 103, and the scanning mirror 104 described above with reference to FIG. 1A, respectively, and the above description also applies to these components. Therefore, the description of these components will be omitted.

The display device 300 may be connected to, for example, an information processing device 320 that transmits a video signal to the drawing system.

Note that, in the optical system included in the display device 300, unlike the optical system included in the display device 100, the magnitude relationship between the laser light beam diameter at the emission point of the laser light source and the laser light beam diameter at the time of reaching the retina may be reversed. Therefore, the beam diameter at the emission point of the laser that emits the laser light reaching the region including the fovea may be larger than the beam diameter at the emission point of the laser that emits the laser light reaching the region not including the fovea. In order to achieve such a beam diameter, the size of the emission point of the optical waveguide element may also be adjusted. For example, among the plurality of emission points included in the optical waveguide element, the size of the emission point of the laser light reaching the region including the fovea may be larger than the size of the emission point of the laser light reaching the region not including the fovea. By controlling the laser light by the drawing system 301 as described above, it is possible to prevent image quality degradation due to the presence of a portion where the scanning lines are coarse and a portion where the scanning lines are minute in a case where the Foveated rendering technology is applied.

The scanning mirror 304 scans laser light emitted from the drawing system 301. By the scanning, a video (for example, a two-dimensional video) is formed from the laser light. The laser light scanned by the scanning mirror 304 reaches any projection surface 305, and a video is displayed on the projection surface 305.

The display device 300 may be configured as a small projector, and may be configured as, for example, a projector having a size of being placed on a palm of a human. A small projector having this size is also called a pico projector.

The display device 300 may not include the collimator lens 303, but it is more preferable to include the collimator lens.

The display device 300 may cause the laser light scanned by the scanning mirror 304 to reach the projection surface 305 without through the projection optical system, or may cause the laser light to reach the projection surface 305 through the projection optical system. That is, in the display device 300, the projection optical system may not be provided or may be provided on the optical path between the scanning mirror 304 and the projection surface 305. The projection optical system may be used, for example, to enlarge or reduce a video formed by the scanning mirror 304. The projection optical system may include, for example, one or a plurality of lenses. The configuration of the projection optical system may be appropriately selected according to a desired video projection method.

Note that, the present disclosure can also have the following configuration.

[1]

A display device including:

a laser light source unit that emits laser light used for video formation by scanning; and a laser light source drive unit that drives the laser light source unit, in which the laser light source unit is configured to be able to emit two or more pieces of laser light having different beam sizes, or configured to be able to emit two or more pieces of laser light and to be able to switch the number of pieces of laser light to be emitted, and the laser light source drive unit changes the laser light emitted from the laser light source unit according to an interval of scanning lines in a case where two or more non-resonant axial direction scanning speeds different from each other are used in a drawing region of one frame of a video.

[2]

The display device according to [1], in which the laser light source unit includes an optical waveguide element, and the two or more pieces of laser light are emitted from the optical waveguide element.

[3]

The display device according to [2], in which the optical waveguide element has two or more emission points having different sizes, and the two or more pieces of laser light are emitted from each of the two or more emission points.

[4]

The display device according to [3], in which, in a case where two or more different non-resonant axial direction scanning speeds are used in a drawing region of one frame of a video, the laser light source drive unit changes the beam size of the laser light emitted from the laser light source unit according to the interval of the scanning lines.

[5]

The display device according to [4], in which the two or more emission points are provided in the optical waveguide element so as to be aligned in the same direction as the non-resonant axial direction in the scanning.

[6]

The display device according to [4], in which the two or more emission points are provided in the optical waveguide element so as to be aligned in the same direction as the resonant axial direction in the scanning.

[7]

The display device according to any one of [1] to [6], in which the laser light source unit includes two or more laser light sources, and the laser light source drive unit changes the beam size of the laser light emitted from the laser light source unit by controlling driving of the two or more laser light sources.

[8]

The display device according to any one of [2] to [7], in which the optical waveguide element includes two or more emission points of the same size, and in a case where two or more different non-resonant axial direction scanning speeds are used in a drawing region of one frame of a video, the laser light source drive unit changes the number of pieces of the laser light emitted from the laser light source unit according to the interval of the scanning lines.

[9]

The display device according to any one of [1] to [8], in which the laser light source unit is configured to be able to emit two or more pieces of laser light having different beam sizes, and the laser light source drive unit causes the laser light source unit to emit laser light having a smaller beam size at an emission point in a case of drawing a region where a slower non-resonant axial direction scanning speed is used.

[10]

The display device according to any one of [1] to [8], in which the laser light source unit is configured to be able to emit two or more pieces of laser light and to be able to switch the number of pieces of laser light to be emitted, and the laser light source drive unit causes the laser light source unit to emit a smaller number of pieces of laser light in a case of drawing a region where a slower non-resonant axial direction scanning speed is used.

[11]

The display device according to any one of [1] to [10], in which the laser light source drive unit stops the emission of the laser light by the laser light source unit while the non-resonant axial direction scanning speed changes in the drawing region of one frame.

[12]

The display device according to [11], in which the laser light source unit includes an optical waveguide element having two or more emission points having different sizes, and the two or more emission points of the optical waveguide element are spaced apart such that an angle of view of the laser light in the non-resonant axial direction immediately before a stop period of emission of the laser light matches an angle of view of the laser light in the non-resonant axial direction immediately after the stop period of emission of the laser light.

[13]

The display device according to any one of [1] to [12], in which the display device is configured to condense the laser light scanned by the scanning mirror near a pupil to reach a retina.

[14]

The display device according to any one of [1] to [12], in which the display device is configured to cause the laser light scanned by the scanning mirror to reach a projection surface without through a projection optical system or through the projection optical system.

REFERENCE SIGNS LIST

100 Display device
101 Drawing system

102 Line-of-sight detection unit
103 Collimator lens
104 Scanning mirror
105 Relay lens
106 Hologram element

What is claimed is:

1. A display device, comprising:
a laser light source unit that emits laser light used for video formation by scanning; and
a laser light source drive unit that drives the laser light source unit,
wherein the laser light source unit is configured to draw at least first and second regions of an image frame by:
emitting a scanning line using a first beam size for use in the first region of the image frame and using a second beam size for use in the second region of the image frame, wherein the first beam size is larger than the second beam size; or
emitting a scanning line using a first number of pieces of laser light in the first region of the image frame and using a second number of pieces of laser light in the second region of the image frame, wherein the first number of pieces of laser light is greater than the second number of pieces of laser light,
wherein a first interval of scanning lines and a first scanning speed in a non-resonant axial direction is applied in the first region of the image frame,
wherein a second interval of scanning lines and a second scanning speed is applied in the non-resonant axial direction is applied in the second region of the image frame,
wherein the first interval of scanning lines is greater than the second interval of scanning lines,
wherein a first non-resonant axial direction scanning speed is used in drawing the first region of the image frame,
wherein a second non-resonant axial direction scanning speed is used in drawing the second region of the image frame, and
wherein the image frame is a frame of a video.

2. The display device according to claim 1, wherein the laser light source unit includes an optical waveguide element, wherein the first number of pieces of laser light is two or more, and wherein the two or more pieces of laser light are emitted from the optical waveguide element.

3. The display device according to claim 2, wherein the optical waveguide element has two or more emission points having different sizes, wherein the first number of pieces of laser light is two or more, and wherein the two or more pieces of laser light are emitted from each of the two or more emission points.

4. The display device according to claim 3, wherein the two or more emission points are provided in the optical waveguide element so as to be aligned in a same direction as the non-resonant axial direction in the scanning.

5. The display device according to claim 3, wherein the two or more emission points are provided in the optical waveguide element so as to be aligned in a same direction as a resonant axial direction in the scanning.

6. The display device according to claim 2, wherein the optical waveguide element includes two or more emission points of a same size.

7. The display device according to claim 1, wherein the laser light source unit includes two or more laser light sources, and the laser light source drive unit changes the beam size of the laser light emitted from the laser light source unit by controlling driving of the two or more laser light sources.

8. The display device according to claim 1, wherein the laser light source unit is configured to be able to emit two or more pieces of laser light having different beam sizes.

9. The display device according to claim 1, wherein the laser light source unit is configured to be able to emit two or more pieces of laser light and to be able to switch the number of pieces of laser light to be emitted.

10. The display device according to claim 1, wherein the laser light source drive unit stops emission of the laser light by the laser light source unit while the scanning speed in the non-resonant axial direction changes.

11. The display device according to claim 10,
wherein the laser light source unit includes an optical waveguide element having two or more emission points having different sizes, and the two or more emission points of the optical waveguide element are spaced apart such that an angle of view of the laser light in the non-resonant axial direction immediately before a stop period of emission of the laser light matches an angle of view of the laser light in the non-resonant axial direction immediately after the stop period of emission of the laser light.

12. The display device according to claim 1, wherein the display device is configured to condense the laser light scanned by a scanning mirror near a pupil to reach a retina.

13. The display device according to claim 1, wherein the display device is configured to cause the laser light scanned by a scanning mirror to reach a projection surface without through a projection optical system or through the projection optical system.

14. The display device according to claim 1, wherein the first non-resonant axial direction scanning speed is greater than the second non-resonant axial direction scanning speed.

* * * * *